(12) United States Patent
Steinfield et al.

(10) Patent No.: US 7,038,867 B2
(45) Date of Patent: *May 2, 2006

(54) FILTER FOR DISPLAY SYSTEM

(75) Inventors: Steven W. Steinfield, San Diego, CA (US); Mohammad M. Samii, La Jolla, CA (US); Jack H. Schmidt, Carlsbad, CA (US); Matthew Giere, San Diego, CA (US); David Tyvoll, La Jolla, CA (US); Noah Lassar, San Diego, CA (US); Winthrop D. Childers, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/153,512

(22) Filed: Jun. 14, 2005

(65) Prior Publication Data
US 2005/0231840 A1    Oct. 20, 2005

Related U.S. Application Data

(63) Continuation of application No. 10/251,241, filed on Sep. 19, 2002, now Pat. No. 6,920,000.

(51) Int. Cl.
*G02B 5/24* (2006.01)

(52) U.S. Cl. ............. 359/886; 359/885; 359/889; 359/358; 349/106

(58) Field of Classification Search ........ 359/885–887, 359/358, 889, 890, 228; 349/106, 108; 353/84
See application file for complete search history.

Primary Examiner—Leonidas Boutsikaris

(57) ABSTRACT

A filter for a display system is provided which includes a fluid chamber having a selectively moveable filtering fluid, plural electrodes being coupled with the fluid chamber to accommodate establishment of an electric field whereby the filtering fluid may be selectively positioned in an optical path.

14 Claims, 2 Drawing Sheets

FILTER FOR DISPLAY SYSTEM

CROSS-REFERENCE TO RELATED APPLICATION

This is a continuation of application Ser. No. 10/251,241 filed on Sep. 19, 2002, now U.S. Pat. No. 6,920,000, which is hereby incorporated by reference.

BACKGROUND OF THE INVENTION

Liquid crystal display (LCD) devices have become popular in recent years. These display devices typically offer the advantage of being thinner and lighter than conventional cathode ray tube (CRT) displays. Moreover, LCD devices typically require less power than CRT displays.

In its simplest form, an LCD device includes a liquid crystal material interposed two glass panels and two polarizing filters. Typically, an external light source directs light onto the LCD. For example, in most computers employing an LCD, fluorescent tubes and diffusion panels scatter light onto the LCD. The light typically is directed through to the liquid crystal material, which depending on its state, may either allow light to pass through the display or diffuse the light. The state of the liquid crystal material typically is controlled via an electrode or switching device.

Specifically, the polarizing filters in an LCD may operate to pass only light that is oriented in a specific direction. These filters may significantly reduce the amount of light that is produced by the display. Such a reduction may substantially reduce the overall brightness of the display.

Color LCD devices also may suffer from a loss of light. For example, in a typical color LCD device, each display pixel includes three separate sub-pixels, a red sub-pixel, a green sub-pixel, and a blue sub-pixel. Each sub-pixel typically includes a color filter that allows light of a certain wavelength to pass through. Thus, the maximum transmission of any primary color in an LCD array may only be through one-third of the pixels. Moreover, the perception of white light may be a result of each filter simultaneously allowing red, green, and blue light to pass. Filtering out unwanted wavelengths results in a reduction in the brightness of the display. To compensate for the reduction in brightness, a high-powered backlight may be employed. However, such a light may cause an increase in the temperature, weight, bulk, power consumption, and cost of the system.

The sub-pixels in a color LCD may further impact the resolution of the display. As briefly described above, a color LCD device typically includes an array of pixels. Each pixel may include sub-pixels, which are typically arranged in a common plane. Regardless of the arrangement, each such sub-pixel requires a certain amount of physical space. This physical space requirement affects how tightly the pixels may be packed together in the LCD array. Thus, both the resolution and the brightness of the screen may be constrained by the physical arrangement and size of the sub-pixels.

SUMMARY OF THE INVENTION

A filter for a display system is provided which includes a fluid chamber having a selectively moveable filtering fluid, plural electrodes being coupled with the fluid chamber to accommodate establishment of an electric field whereby the filtering fluid may be selectively positioned in an optical path.

DETAILED DESCRIPTION

Figure 1:
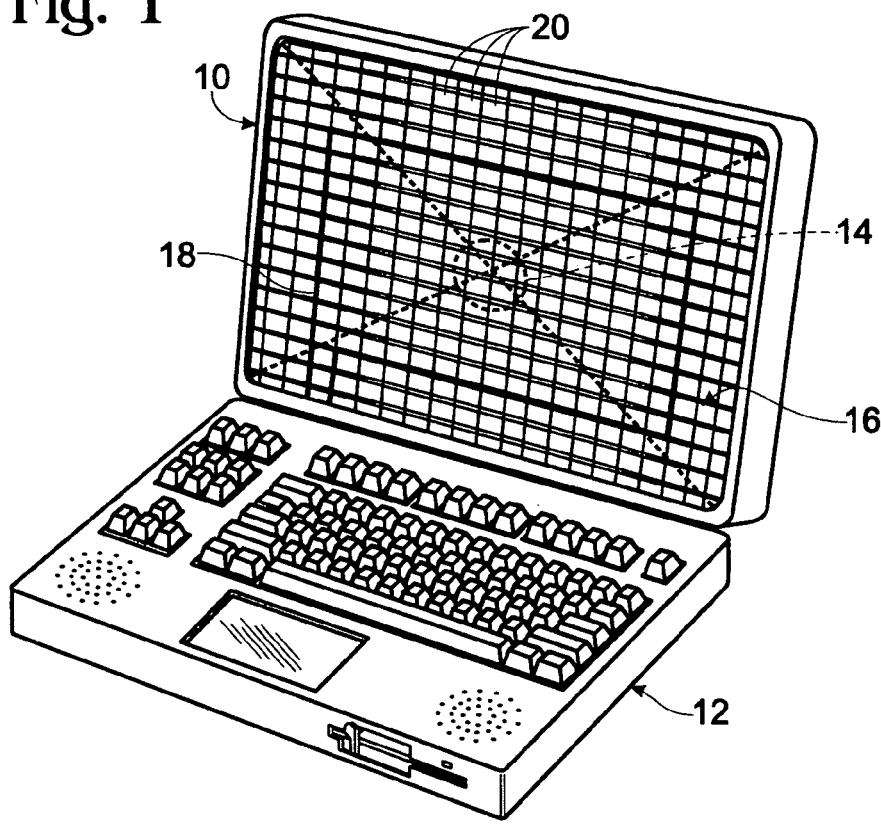
FIG. 1 is an isometric view of a filter display device according to an embodiment of the present invention as used within a laptop computer.

FIG. 1 illustrates, at 10, a filter display device configured to generate and display images. Filter display device 10 may be used in any device where a display typically is used. For example, filter display device 10 may be incorporated within a laptop computer, as shown at 12, a personal computer monitor, a cellular phone display, a personal digital assistant display, a handheld computer display, a television screen, etc.

Filter display device 10 typically includes a light source or illumination source 14 configured to direct light along an optical path or light path toward a display screen 16 to produce an image 18. Light source 14 may be any suitable device configured to generate light and direct the light toward display screen 16. For example, light source 14 may be a mercury lamp, a fluorescent lamp, such as a cold cathode fluorescent lamp (CCFL), or other suitable light-generating device. In some embodiments, light from the light source may be diffused by a diffusion panel. Such a diffusion panel typically is configured to scatter light uniformly across display screen 16.

As indicated, display screen 16 may include a plurality of display elements, or pixels, 20, which cooperatively interact to generate an image. Display elements, as used herein, are the image-forming units of display screen 16. Typically, the display elements may include sub-elements or sub-pixels and may be capable of emitting or transmitting light within the visible-light spectrum to produce image 18.

Figure 2:
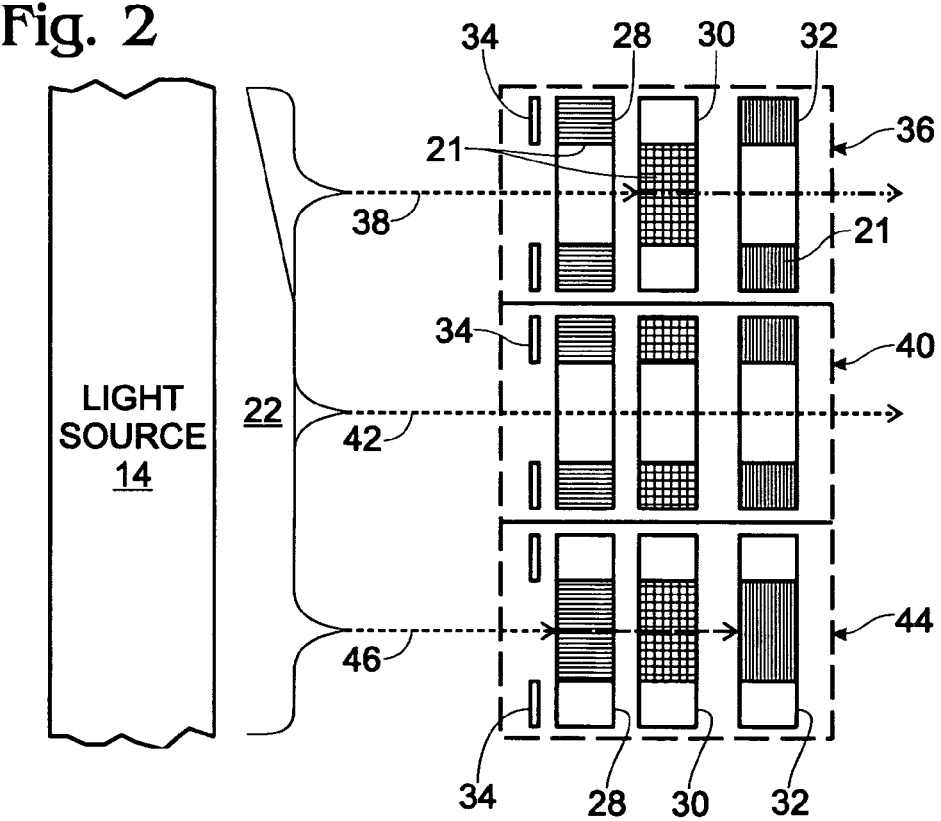
FIG. 2 is a somewhat schematic view demonstrating operation of a plurality of display elements of the filter display device shown in FIG. 1, each display element having a plurality of color filters.

FIG. 2 illustrates light 22 directed toward a plurality of display elements, 36, 40, and 44. Specifically, light 22 is generated via light source 14 and directed toward the display elements. As will be appreciated, in the illustrated embodiment, light 22 passes through each display element along a corresponding optical path (indicated generally by dashed lines 38, 42, 46).

As illustrated, each display element 20 may include plural filters 28, 30, 32. Each such filter may include a filtering fluid 21, such as a light-absorbing medium, which may be selectively positioned within each filter, and which may be configured to selectively block particular wavelengths (colors) of light and to pass other different wavelengths (colors) of light. Filtering fluid 21 is typically a colored fluid, such as a pigmented liquid or dye. For example, filtering fluid 21 may be ink, toner, or other suitable colored liquid. It should be noted that filtering fluid 21 may be virtually any medium, including a gas, a gelatin resin, or some other fluid which may be adapted to filter light and selectively move into, and out of, the optical path.

In FIG. 2, each display element includes multiple color filters, and may be capable of dynamically emitting one of plural possible colors. Specifically, each display element 36, 40, 44 includes a cyan filter 28, a yellow filter 30, and a magenta filter 32. As described briefly above, each of these color filters includes a filtering fluid configured to pass only particular wavelengths of light. For example, the filtering fluid in the cyan filter may block or absorb all light except cyan light, the filtering fluid in the yellow filter may block or absorb all light except yellow light, and the filtering fluid in the magenta filter may block or absorb all light except magenta light. Other-color filters are possible, including, but not limited to, red filters, green filters, blue filters, etc. Moreover, although three filters are illustrated, virtually any number of filters may be used, and such configurations are within the scope of the invention.

The filters may be stacked or overlapped within the display element. Thus, in FIG. 2, each display element 36, 40, 44 includes three filter layers. One skilled in the art will appreciate, however, that virtually any number of filter layers may be used. The depth of each display element may depend on the number of filter layers. Moreover, the footprint of each display element substantially corresponds to the footprint of a single filter. Thus, the number of filters in each display element need not increase the surface area of the display element on the screen. Accordingly, more display elements may be packed onto screen 16 (relative to a conventional display screen) increasing the density of display elements on the screen. This increased density of display elements may translate to a higher resolution screen.

As indicated, each display element 36, 40, 44 may include an aperture or light guide 34 that directs light through the display element along an optical path, as illustrated respectively at 38, 42, 46. Aperture 34 defines the optical path or light-transmission area of each display element. For example, in display element 36 in FIG. 2, light is directed through filters 28, 30, and 32 along optical path 38. Similarly, aperture 34 of display element 40 directs light along path 42, while aperture 34 of display element 44 directs light along optical path 46. Aperture 34 may be an opaque region that prevents light from passing through the filter, and/or a mask that covers portions of the display element to define a light beam of a selected size and shape. Moreover, although illustrated as preceding filters 28, 30, 32, aperture 34 may be integrated with, or follow, one or more of the filters.

In the presently illustrated embodiment, light passes through optical path regions or light-transmission areas of the filters, such as the medial portions of the filters shown in FIG. 2. Although illustrated herein as medial portions, the optical path region of each filter may be any part of the filter, and is not limited to the medial region of the filter. For example, the optical path region may be an end region, a side region, a top region, a bottom region, etc. In one embodiment, the filter may effectively be divided in half, with half of the filter defining a transmissive optical path region, and the other half of the filter defining a non-transmissive masked region. Depending on the state of each filter, light may or may not be filtered as it passes through the optical path region of such filter.

Typically, each filter has at least two states, a non-filtering pass-through state and a filtering state. In the pass-through state, light passes substantially uninterrupted (unfiltered) through the filter. In the filtering state, light passes through at least a portion of the filtering fluid, and is filtered thereby.

As shown in display element 36 in FIG. 2, filter 28 is in a pass-through state. The filtering fluid thus is substantially outside of the light transmission area, allowing impinging light to pass uninterrupted through the filter.

In contrast, filter 30 of display element 36 is in a filtering state. In such a configuration, the filtering fluid is substantially disposed within the optical path. Thus, in the filtering state, light passes through the filtering fluid as it travels along the optical path. Specifically, in the filtering state, the filtering fluid in the filter is selectively positioned such that at least a portion of the light must pass through the filtering fluid. The filtering fluid in turn blocks some wavelengths (colors) of light, while other wavelengths (colors) of light are passed through.

As will be appreciated, each filter within a display element may be individually controlled. Specifically, adjacent filters may be selectively controlled such that adjacent filters are in different states. Thus, a cyan filter may be in a different state than a neighboring magenta filter or a yellow filter. For example, in display element 36 in FIG. 2, cyan filter 28 and magenta filter 32 are shown in a pass-through state, while yellow filter 30 is shown in a filtering state. In such a configuration, light 22 passes through cyan filter 28. Light 22 then passes through yellow filter 30 where the filtering fluid 21 in yellow filter 30 obstructs the optical path and blocks substantially all light except yellow light (as indicated by the change in line quality). The yellow light that passes through yellow filter 30 is then passed through magenta filter 32. The result of such a configuration is the emission of yellow light from display element 36.

Similarly, (although not illustrated) cyan light may be produced when the cyan filter is in a filtering state and the other filters are in pass-through states. In such a configuration, the filtering fluid in the cyan filter blocks all light except cyan light. The cyan light then may be passed through the other filters. Similarly, magenta light may be produced when the magenta filter is in a filtering state and the other filters are in pass-through states. In such a configuration, the filtering fluid in the magenta filter blocks all light except magenta light, which then is passed through the other filters.

Colors other than cyan, yellow, and magenta also may be produced using cyan filter 28, yellow filter 30 and magenta filter 32. For example, if both the cyan filter and the yellow filter are in a filtering state, then the display element will produce green light. The green color results because the cyan filter blocks red light, but passes green and blue light. The yellow filter blocks blue light, but passes green light and red light. Since the cyan filter only passes green light and blue light, and the yellow filter only passes green light and red light, the only color to pass through both filters is green light. Similarly, when only the yellow filter (which passes green light and red light) and the magenta filter (which passes red light and blue light) are in filtering states, the display element will produce red light. Likewise, when only the magenta filter (which passes red light and blue light) and the cyan filter (which passes green light and blue light) are in filtering states, the display element will produce blue light.

White light may be produced when all the filters in a single display element are in a pass-through state. For example, all of the filters in display element 40 are shown in pass-through states, resulting in production of white light. Specifically, the filtering fluid in each filter is disposed substantially outside the optical path region and thus the fluid does not substantially interrupt the light as it travels along optical path 42 through display element 40. Accordingly, light travels along optical path 42 without passing through any type of filtering fluid. Since no filtering has occurred, white light may be passed through and produced by display element 40 in the configuration shown.

Display element 40 further illustrates that a layered configuration of filters may increase the brightness of the image over conventional display systems. Such an increase occurs because light may be passed directly through to the screen without being filtered. Specifically, when all of the liquid filters in a single display element are in pass-through states, the display element may pass substantially all of the light through the display element. Such a configuration may enable the use of lower-powered light sources because very little light may be lost in generation of the image. Moreover, since a lower-powered light source may be used, the effective life of a battery within a device incorporating such a layered filter display may be increased. Similarly, the device may be smaller and lighter, since less power is needed for the light source.

Display element 44 (as shown in FIG. 2) illustrates a configuration whereby all of the filters in the display element are in filtering states. As light 22 travels along optical path 46, each filter successively filters out specific wavelengths of light (colors), thereby removing substantially all visible light to produce a dark display element. Specifically, cyan filter 28 filters out all light except cyan light. Thus, since cyan light is composed of green and blue light, both green and blue light may pass through. Yellow filter 30 then filters out all light except yellow light. Since yellow light is composed of green light and red light, the green light passes through yellow filter 30, while the blue light is blocked. Magenta filter 32 passes red and blue light, and thus since only green light is directed at the filter, no light passes through the final filter, thereby causing display element 44 to appear dark when in the configuration shown.

In one embodiment, light may be modulated by the display elements so as to accommodate production of various intensities of resultant light. Various shades of gray, for example, may be produced by selected time-interleaving of white light (produced where all filters are in the pass-through state) with no light (where all filters are in the filtering state). Alternatively, or additionally, incident or resultant light may be modulated by a separate spatial light modulator configured to selectively disrupt (or pass) white and/or colored light. Either arrangement may be configured to produce a full color gamut.

Figure 3:
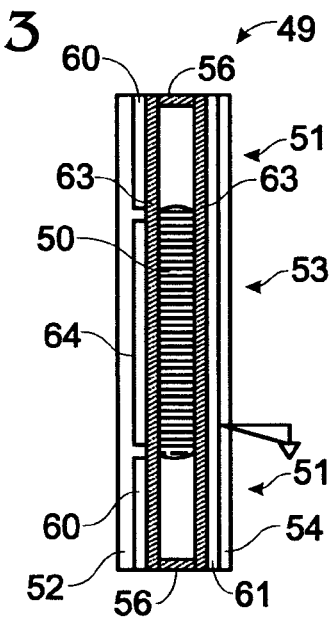
FIG. 3 is a side view of a single color filter in a filtering state.

FIG. 3 illustrates a filter 49 in a filtering state. Specifically, filter 49 may include a filtering fluid 50 interposed two plates 52 and 54. Typically plates 52, 54 are a transparent material, such as glass or plastic. The periphery of the filter may include a barrier 56 to prevent the fluid from draining from the filter. Plates 52 and 54, in combination with barrier 56, thus may be configured to provide a sealed fluid chamber or container for fluid 50. In the illustrated embodiment, the sealed chamber includes a masked region 51 and an optical path region 53.

Figure 4:
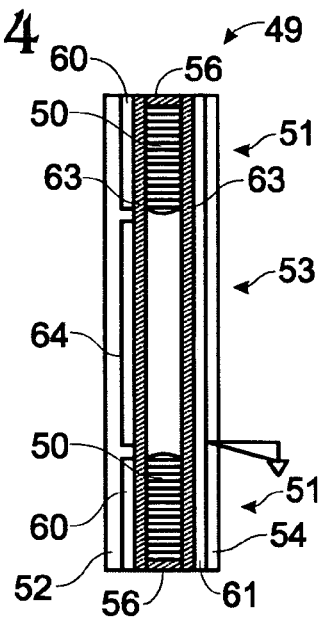
FIG. 4 is a side view of the color filter of FIG. 3, but with the color filter in a non-filtering pass-through state.
Figure 5:
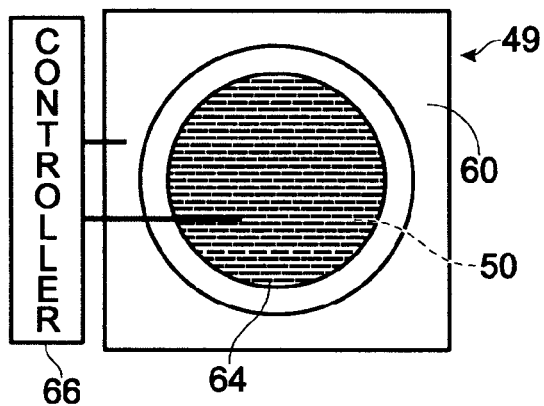
FIG. 5 is a front view of the color filter of FIG. 3 in a filtering state.
Figure 6:
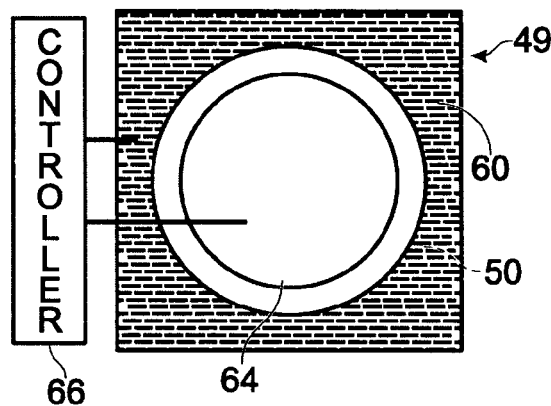
FIG. 6 is a front view of the color filter of FIG. 3 in a non-filtering pass-through state.

As described above, each filter includes a region that is within the optical path (optical path region 53), and a region that is outside the optical path (masked region 51). When the filter is in a filtering state (as shown in FIGS. 3 and 5), the filtering fluid is at least partially disposed within the optical path region. When the filter is in a non-filtering pass-through state (as shown in FIGS. 4 and 6), the filtering fluid is substantially disposed within the masked region 51, outside optical path region 53.

Fluid 50 may be selectively moved into, and out of, the optical path region by changing the material surface-energy characteristics of a region within the fluid chamber. The surface-energy characteristics cooperate with the fluid to establish a selectively movable filtering device. Multiple mechanisms may be used to change the surface-energy characteristics, including electrocapillarity. Specifically, electrocapillarity, as used herein, includes modification of the surface-energy characteristics of the fluid chamber by the action of an electric field, current or charge. Changing the surface characteristics may include changing the hydrophilic and hydrophobic properties of the surface or lining of the fluid chamber. The following description provides for a hydrophobic lining, however, it will be appreciated that in some embodiments the lining may be hydrophilic.

In one embodiment, illustrated in FIGS. 3–6, the chamber of filter 49 may be lined with a nominally hydrophobic material 63. By altering the hydrophobic characteristics of select portions of the chamber, fluid, regardless of charge, may be moved into, and out of, the optical path region 53. Electrodes or other conductive elements may be coupled with the chamber to produce an electric field, which may alter the surface characteristics of the chamber. The fluid within the chamber may react to the change in the surface characteristics.

The arrangement of the electrodes associated with filter 49 may vary. For example, in FIGS. 3–6, two electrodes are coupled with the chamber on a first side of the chamber, a mask electrode and an optical path electrode. A ground electrode, or common ground 61 typically is coupled with the chamber on a second opposite side of the chamber. In the present embodiment, the mask electrode takes the form of a peripheral electrode 60 outside the optical path, while the optical path electrode takes the form of a medial electrode 64 in the optical path. The ground electrode is disposed opposite both the medial and peripheral electrodes so as to accommodate selected establishment of an electric field within the chamber as will be described further below. Other configurations are possible, however, and such language is not intended to be limiting. It further should be noted that the shape, position and number of electrodes may vary depending on the configuration of the filter. Thus, it should be appreciated that in some embodiments, only a single control electrode (e.g., either the optical path electrode or the mask electrode) may be used in combination with the opposing ground electrode.

Typically, medial electrode 64 is transparent, such that light may travel through medial electrode 64 along an optical path through filter 49. Ground electrode 61 also is transparent, also allowing light to pass through. Likewise, peripheral electrode 60 may be transparent, but also may be opaque, and thus, may function as a light guide (as described above). Furthermore, the electrodes need not necessarily be planar conductor pads, as shown, but rather may take any form suitable for introducing a localized field or charge within a fluid chamber.

As discussed briefly above, applying a charge to any one of the control electrodes, peripheral electrode 60 and/or medial electrode 64, may produce an electric field that affects the surface properties of the region associated with the charged electrode. Thus, applying a charge to medial electrode 64, results in an electric field within optical path region 53 of filter 49. Such an electric field may result in a change in the surface characteristics of that region. Specifically, in the illustrated embodiment, applying an electrical charge to medial electrode 64 may produce an electric field that causes optical path region 53 to become temporarily less hydrophobic than masked region 51. The change in the surface characteristic may cause fluid 50 to flow from masked region 51 (a now more hydrophobic region) into optical path region 53 (a now less hydrophobic region). When fluid 50 is in the optical path region, filter 49 is in a filtering state, as shown in FIGS. 3 and 5.

As discussed above, application of an electric charge may create a localized electric field that creates a change in the surface characteristics, such as a less hydrophobic (more hydrophilic) region within the chamber. FIGS. 4 and 6 illustrate application of a charge to peripheral electrode 60. Specifically, applying a charge to peripheral electrodes 60 may result in a localized electric field that produces a change in the surface characteristics of masked region 51, e.g. masked region 51 may become less hydrophobic (more hydrophilic). Fluid 50 may flow into the peripheral region, away from the more hydrophobic optical path region 53. In such a configuration, the optical pathway is unobstructed and the filter is in a pass-through state. In such a state, light may pass through the filter.

Filtering fluid thus may be moved selectively between masked region 51 and optical path region 53 by selectively applying a surface-characteristic-altering electric field in one or the other region. Furthermore, one region or the other (typically the optical path region) may nominally have a surface characteristic which is more hydrophobic than the other region so as to establish a bias to one state over another state. This may be accomplished either via switched input or differential nominal surface characteristic in the masked region and optical path region.

In another embodiment of the present invention, fluid 50 may be an electrostatically-charged fluid configured to react to an applied electric field. For example, fluid 50 may be a negatively-charged fluid that is attracted to an applied positive electric field and repelled from an applied negative electric field. Alternatively, although the following description describes a negatively-charged fluid, in some embodiments, fluid 50 may be positively charged or uncharged.

An electric field may be applied to the fluid chamber via one or more of the control electrodes in combination with the ground electrode. The electrodes may be configured to produce an electric field that actuates movement of the fluid within the chamber. For example, a particular electrode pair may be configured to produce an electric field in a corresponding region of the filter. The charged fluid within the filter chamber, in turn, may be either attracted or repelled by the applied electric field, and thus, the fluid may move into, or out of, the region associated with the electrodes.

For example, in FIGS. 3 and 5, peripheral electrode 60 may be coupled with the fluid chamber. A negative charge thus may be applied to mask electrode 60 to produce a negative electric field within masked region 51, whereby a negatively-charged fluid may be repelled away from the masked region of the filter. The fluid thus may move toward optical path region 53 of the filter such that the filter may be placed in a filtering state. In the filtering state, the fluid may interrupt the optical path of the light, thereby filtering the light as it travels along the optical path. In the filtering state, the impinging light thus may be filtered to produce a color.

As discussed above, optical path region 53 may also include a control electrode, such as optical path electrode 64. Alternatively, or in combination with mask electrode 60, optical path electrode 64 also may be charged to actuate fluid motion. As discussed above, optical path electrode 64 typically is transparent such that light may pass uninterrupted through the electrode. Optical path electrode 64 may be separately controlled to effect fluid motion within optical path region 53, and may be used alone, or in combination with, mask electrode 60. For example, optical path electrode 64 may be positively charged to produce a positive electric field within optical path region 53, causing a negatively-charged fluid 50 to flow into optical path region 53.

Similarly, applying an electric field via the electrodes may cause an electrostatically-charged fluid to transition into a non-filtering pass-through state. FIGS. 4 and 6 show filter 49 in a pass-through state. In the present embodiment, a negative charge may be applied to optical path electrode 64 and/or a positive charge applied across mask electrode 60 to produce a corresponding electric field. Applying a negative charge to optical path electrode 64 and/or a positive charge to mask electrode 60 may result in negatively-charged fluid 50 flowing out of optical path region 53 and into the masked region 51, such that optical path region 53 is substantially unobstructed. When the optical path region is substantially unobstructed, the optical path is clear and the filter is in a non-filtering pass-through state.

The electrodes coupled with each filter may be selectively controlled via a controller 66, as illustrated in FIGS. 5 and 6. Controller 66 selectively controls the charge applied across the electrodes, and the resulting motion of fluid 50 within the filter. By controlling the field applied across the electrodes, it is possible to selectively control that state of the filters in a display element and the color emitted by the display element. Each filter may be individually controlled.

Figure 7:
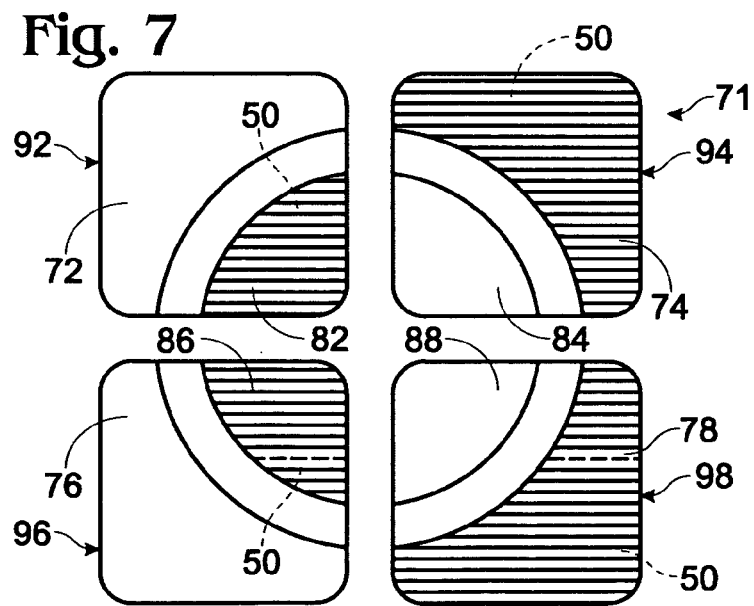
FIG. 7 is a front view of another color filter in a half-tone state.

In some embodiments, the display elements may produce graduated colors. To produce graduated colors, the filters in a display element may be in half-tone states. A half-tone state, as used herein, includes any configuration of a filter, wherein a portion of the optical path is blocked by a filtering fluid, while concurrently, a different portion of the optical path is substantially unobstructed. For example, in FIG. 7, a filter 71 is illustrated in a half-tone state. Specifically, filter 71 includes multiple electrodes, four peripheral electrodes 72, 74, 76, and 78 and four optical path electrodes 82, 84, 86, and 88. The peripheral electrodes are paired with optical path electrodes to form a sub-region or sub-pixel. Thus, as illustrated in FIG. 7, there are four sub-pixels, 92, 94, 96, and 98. It should be appreciated that each sub-pixel has been spaced apart from all adjacent sub-pixels for clarity.

As with the filters described above, the optical path extends through the optical path regions of the filters. A filtering fluid, such as fluid 50, may be either in the optical path region, wherein the optical path is blocked, or in the masked region, wherein the optical path is unobstructed. By applying a charge to either the optical path electrode and/or the mask electrode of a sub-pixel, the fluid may be moved into, and out of, portions of the optical path via electrostatic forces and/or electrocapillarity.

For example, in FIG. 7, a charge may be applied to mask electrode 72 and/or optical path electrode 82 in sub-pixel 92 causing fluid 50 to flow into the optical path region of the sub-pixel, thereby filtering a portion of the optical path. In some embodiments, a charge to either the mask electrode 72 and/or optical path electrode 82 may create an electric field, which produces a region that is more hydrophilic (less hydrophobic) than another region, whereby the fluid flows into the more hydrophilic region. For example, a charge may be applied to optical path electrode 82, whereby the fluid may flow into the optical path region (less hydrophobic region) of sub-pixel 92. Similarly, in sub-pixel 96, a charge may be applied to optical path electrode 86 to allow fluid 50 to flow into the optical path region of sub-pixel 96. The fluid within the optical path region of sub-pixels 92 and 96 may obstruct a portion of the optical path. Thus, light may be at least partially filtered as it travels through the filter.

However, not all light may be filtered as it travels through filter 71. Specifically, in sub-pixel 94, a charge may be applied to peripheral electrode 74 and/or optical path electrode 84, such that a fluid flows into the masked region of sub-pixel 94, and out of the optical path region of sub-pixel 94, leaving a portion of the optical path substantially unobstructed. For example, fluid 50 may be moved out of the optical path region by applying a charge to either mask electrode 72 and/or optical path electrode 82 to create a more hydrophilic (less hydrophobic) masked region than the optical path region. Similarly, in sub-pixel 98, a charge may be applied to mask electrode 78 and/or optical path electrode 88 such that fluid 50 flows into the masked region of sub-pixel 98 and out of the optical path region of sub-pixel 98. When the fluid is in the masked regions of the sub-pixels 94 and 98, the fluid does not substantially obstruct the optical path of such sub-pixels and light may pass through these portions unobstructed. In other words, filter 71, as described, is in an intermediary or half-tone state, where part of the filter is in a filtering state (sub-pixels 92 and 96) and part of the filter is in a pass-through state (sub-pixels 94 and 98).

In an intermediary state, such as illustrated in FIG. 7, light may be partially filtered. By varying the degree of light filtered through a display element via these intermediary states, it may be possible to vary the intensity of color emitted from the display element. For example, it may be possible to have different gradations of color emitted from the display element. Specifically, the intermediary states may enable a filter to sustain some level of filtering. Moreover, such color gradations may be possible without continually refreshing the filters in the display element.

As a non-limiting example, Table 1, below, illustrates exemplary states for a yellow color filter. Table 1 further illustrates exemplary fluid configurations and resulting colors. For illustrative purposes, the filter in Table 1 includes four sub-pixels, each sub-pixel having a peripheral region and an optical path region. The optical path extends through the optical path region. Fluid may flow between the two regions. When the fluid is disposed within the optical path region, the fluid blocks a portion of the optical path. When the fluid is in the peripheral region, the optical path is substantially unobstructed. Electrodes coupled with or associated with the sub-pixels may control the location of the fluid within such sub-pixels.

Thus, a cyan filter may emit white light, very light cyan light, light cyan light, semi-light cyan light, or cyan light. Similarly, a magenta filter may emit white light, very light magenta light, light magenta light, semi-light magenta light, or magenta light.

Accordingly, as set forth above, a method for filtering light is provided. The method includes directing light along an optical path toward a filter having filtering fluid, the filter further having an optical path region in the optical path and a masked region outside the optical path, selectively applying an electrical charge to the filter to cause fluid to move into the optical path region, driving fluid into the optical path region, and filtering impinging light as it passes through the filter. Selectively applying an electrical charge may include applying an electrical charge to the filter across an electrode associated with at least one of the masked region and the optical path region and/or producing an electrical field in at least one of the masked region and the optical path region. Driving fluid may include changing the surface characteristics of at least one of the masked region and the optical path region. In some embodiments, the filtering fluid is electrically charged and driving fluid includes electrically repelling or electrically attracting fluid from one of the masked region and the optical path region to the other of the masked region and the optical path region.

A method for displaying an image also is provided. The method includes providing an illumination source configured to generate light, directing the light along an optical path through an optical path region of a filter, and selectively altering the state of the filter, such that the optical path region of the filter is selectively blocked. As will be appreciated, selectively altering the state of the filter may include positioning a filtering fluid at least partially in the optical path and/or outside the optical path. Moreover, selectively altering the state of the filter may include applying an electric charge to the filter.

In some embodiments, the display system includes an illumination means for producing light, guiding means for directing light along an optical path through a filter having a filtering fluid, and positioning means for selectively positioning the filtering fluid in at least a portion of the optical path.

TABLE 1

| State of filter | Fluid location within sub-pixel 1 | Fluid location within sub-pixel 2 | Fluid location within sub-pixel 3 | Fluid location within sub-pixel 4 | Resultant color |
| --- | --- | --- | --- | --- | --- |
| Pass-through state | Masked region | Masked region | Masked region | Masked region | White |
| Intermediary state 1 | Masked region | Masked region | Masked region | Optical path region | Very light yellow |
| Intermediary state 2 | Masked region | Masked region | Optical path region | Optical path region | Light yellow |
| Intermediary state 3 | Masked region | Optical path region | Optical path region | Optical path region | Semi-light yellow |
| Fully filtered state | Optical path region | Optical path region | Optical path region | Optical path region | Yellow |

It should be noted that the number of sub-pixels, states, and colors may vary depending on the configuration of the filter, the number of electrodes, and the arrangement of electrodes associated with the filter. Moreover, although Table 1 illustrates resulting colors for a yellow filter, any color filter may have similar states and color gradations.

It should be noted that the above-described fluid filters may be incorporated within existing display systems. Thus, liquid crystal displays may be replaced, or retrofitted, with fluid filter displays.

While various alternative embodiments and arrangements of a filter display system have been shown and described above, it will be appreciated by those of skill in the art that numerous other embodiments, arrangements, and modifications are possible and are within the scope of the invention. In other words, those skilled in the art will understand that many variations may be made therein without departing from the spirit and scope of the invention, as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring, nor excluding two or more such elements.

What is claimed is:

1. A filter for a display system, the filter comprising:
   a fluid chamber having a selectively moveable filtering fluid; and
   plural electrodes coupled with the fluid chamber to accommodate establishment of an electric field whereby the filtering fluid may be selectively positioned in an optical path, and wherein establishment of the electric field selectively produces a less hydrophillic region within a portion of the fluid chamber.

2. The filter of claim 1, wherein the less hydrophilic region is produced by charging of at least one of the plural electrodes to cause the filtering fluid to move into the optical path.

3. A display system, comprising:
   an illumination source configured to produce light and direct light along an optical path;
   a display element having a plurality of overlapping filters in the optical path disposed such that light passes consecutively through the plurality of overlapping filters, each filter including a filtering fluid; and
   at least one electrode associated with each filter, the at least one electrode being configured to selectively establish an electric field which produces a less hydrophobic region within a portion of the fluid chamber to selectively position filtering fluid in the optical path.

4. The display system of claim 3, wherein each filter includes a first region within the optical path and a second region outside the optical path.

5. The display system of claim 4, wherein each filter has a filtering state in which the filtering fluid is disposed within the first region, and a pass-through state in which the filtering fluid is substantially disposed outside the first region.

6. The display system of claim 3, wherein at least one filter has an intermediate state in which the filtering fluid partially obstructs the optical path.

7. The display system of claim 3, wherein the plurality of filters contain different color filtering fluids.

8. The display system of claim 3, wherein the at least one electrode is associated with at least one of a first region within the optical path and a second region outside the optical path, and wherein the at least one electrode is configured to be selectively charged to establish the electric field, and thereby to promote movement of the filtering fluid between the first region and the second region.

9. A display device, comprising:
   an illumination source configured to produce light and direct light along an optical path;
   a display screen having a plurality of display elements, wherein each display element includes at least one fluid filter having at least one electrode associated with a chamber having a selectively alterable hydrophilic characteristic, the at least one electrode being configured to selectively establish an electric field which produces a less hydrophillic region within a portion of the chamber to selectively position filtering fluid in the optical path.

10. The device of claim 9, wherein the fluid filter is configured to pass white light when the fluid is out of the optical path.

11. The device of claim 9, wherein the display element includes a first fluid filter, a second fluid filter and a third fluid filter, each fluid filter overlapping and disposed in the optical path such that light passes consecutively through the first fluid filter, second fluid filter, and third fluid filter.

12. The device of claim 11, wherein the fluid in each filter is a different color from the fluid in the other filters.

13. The device of claim 11, wherein the fluid in each filter is selected from yellow-filtering fluid, cyan-filtering fluid and magenta-filtering fluid.

14. A filter for a display system, the filter comprising:
   a fluid chamber having a selectively moveable filtering fluid; and
   plural electrodes coupled with the fluid chamber to accommodate establishment of an electric field whereby the filtering fluid may be selectively positioned in an optical path, and wherein establishment of the electric field selectively produces a less hydrophobic region within a portion of the fluid chamber.

* * * * *